March 8, 1932. T. PADGETT 1,848,542
TRUCK FOR SANDING SLIPPERY ROADS
Filed Oct. 27, 1930 5 Sheets-Sheet 1
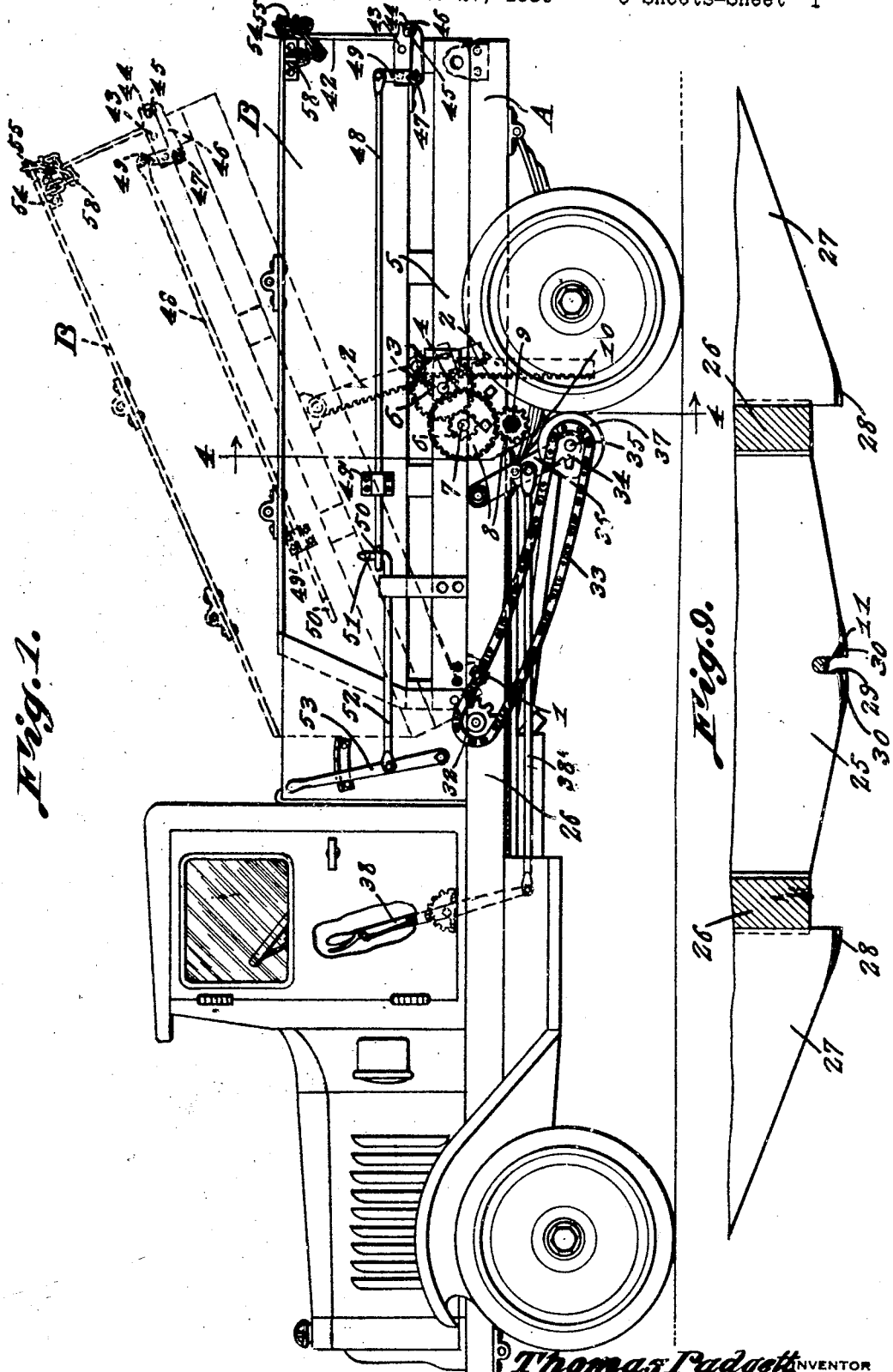

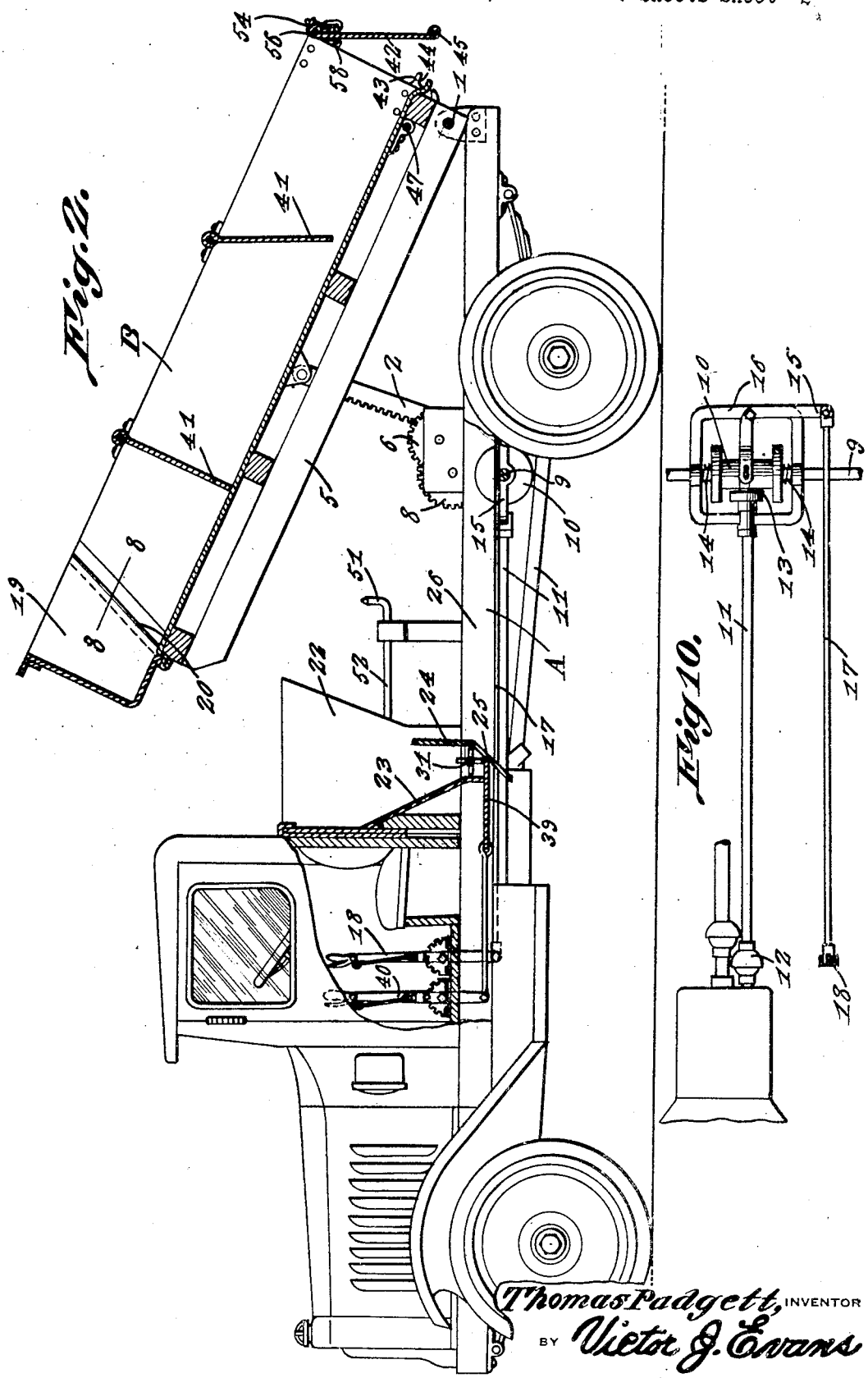

March 8, 1932.　　　　　T. PADGETT　　　　　1,848,542
TRUCK FOR SANDING SLIPPERY ROADS
Filed Oct. 27, 1930　　5 Sheets-Sheet 3
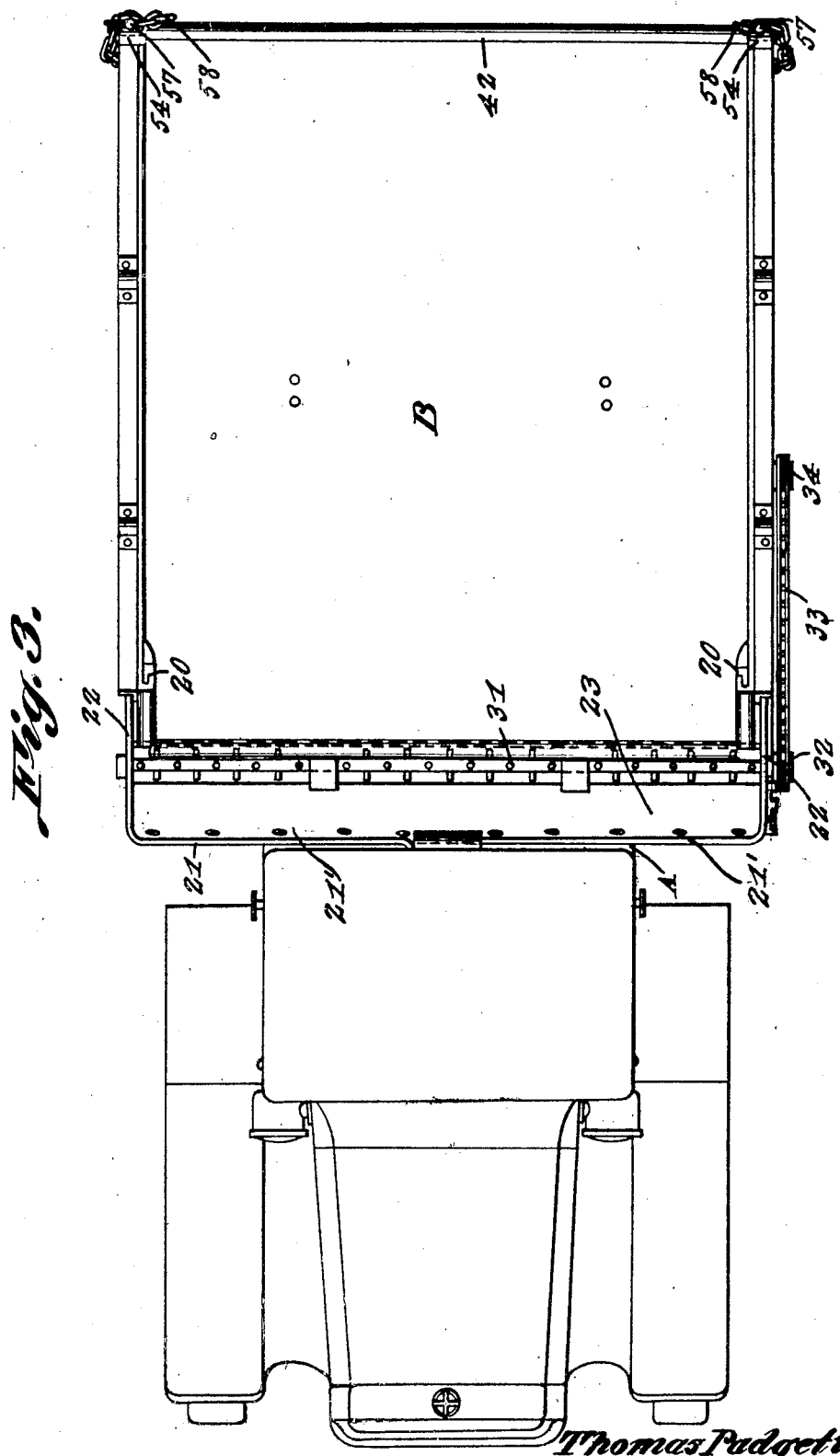

March 8, 1932. T. PADGETT 1,848,542
TRUCK FOR SANDING SLIPPERY ROADS
Filed Oct. 27, 1930 5 Sheets-Sheet 4
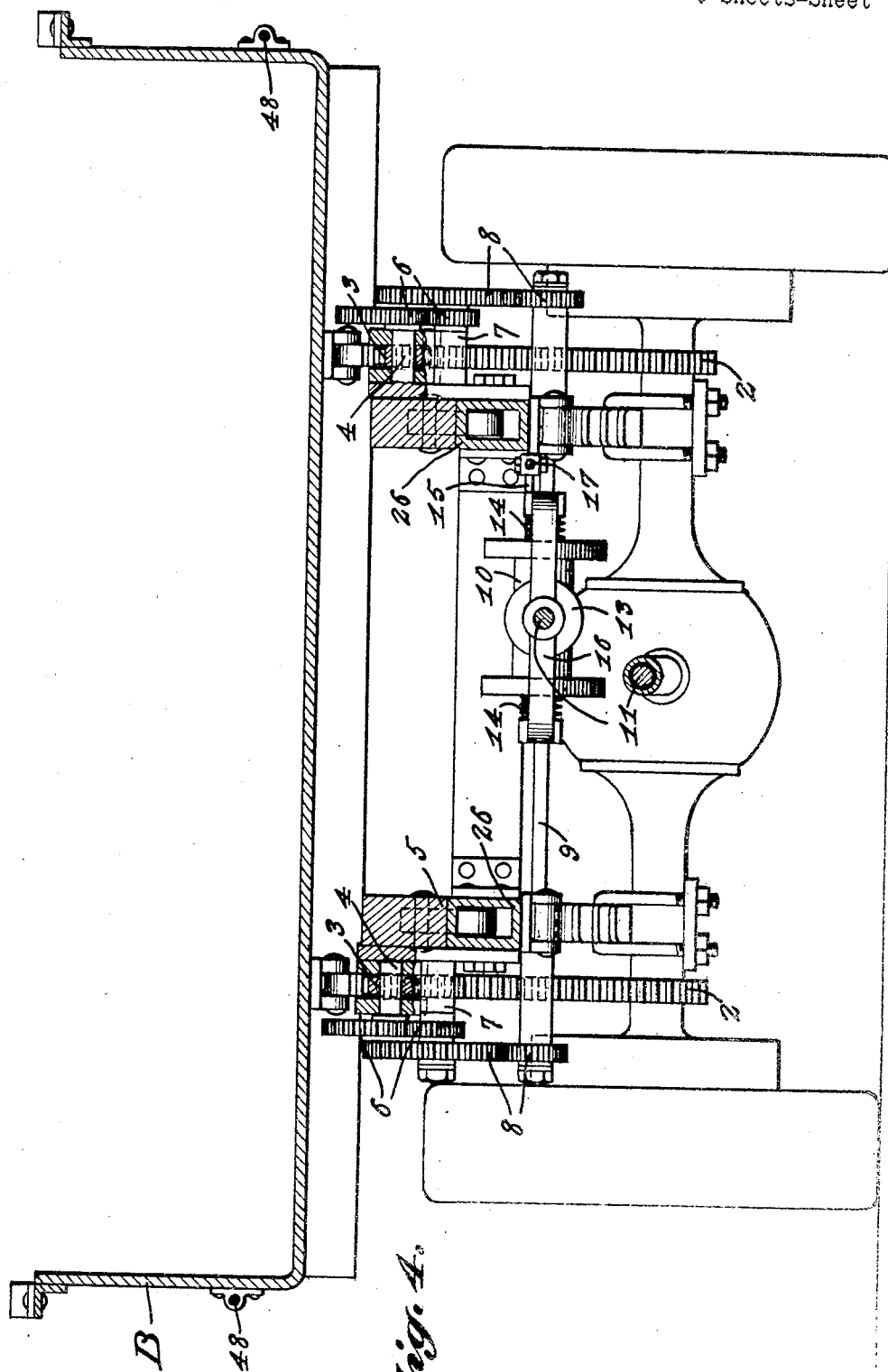

March 8, 1932.  T. PADGETT  1,848,542
TRUCK FOR SANDING SLIPPERY ROADS
Filed Oct. 27, 1930    5 Sheets-Sheet 5
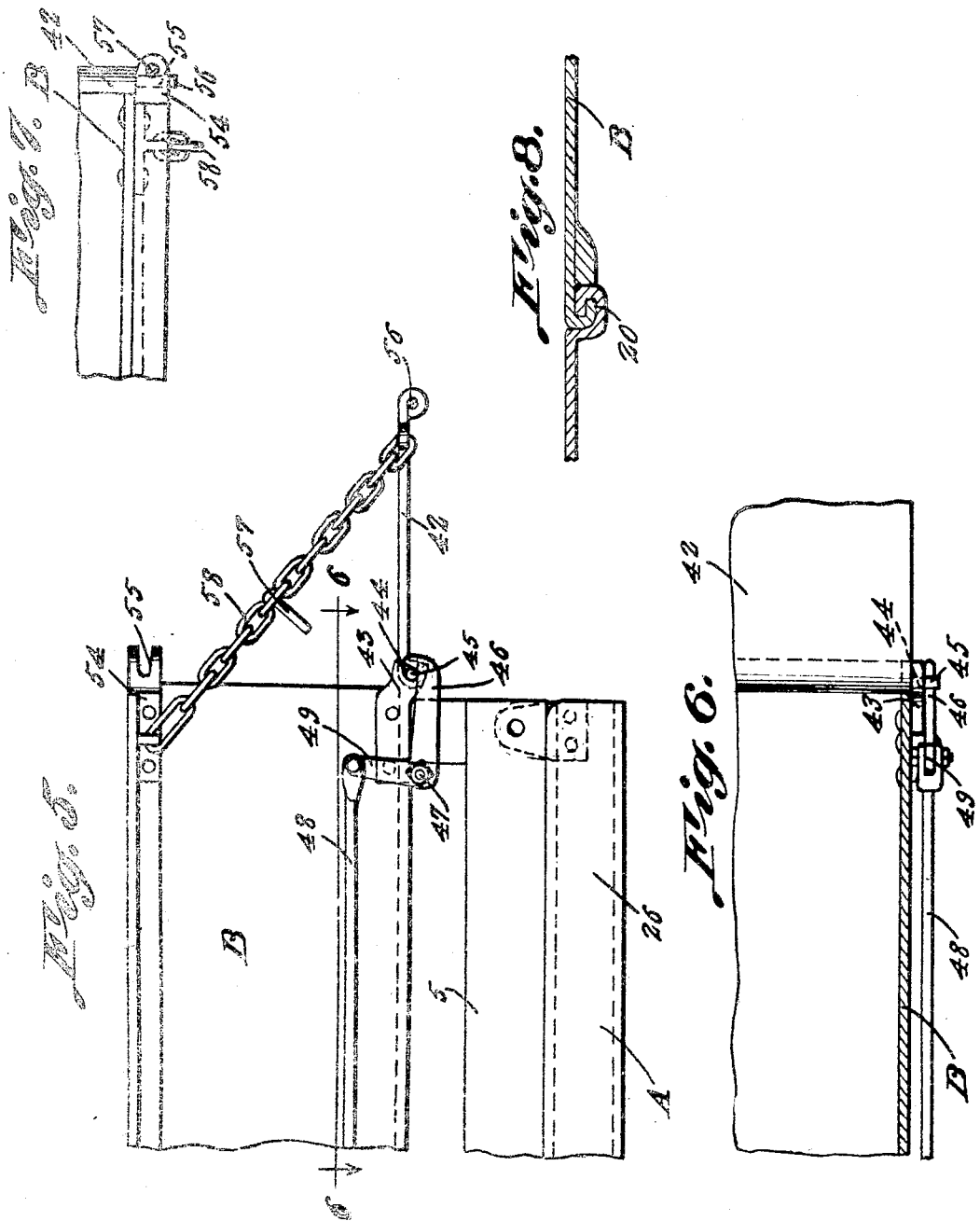
Thomas Padgett, INVENTOR
BY Victor J. Evans
ATTORNEY Patented Mar. 8, 1932

1,848,542

UNITED STATES PATENT OFFICE

THOMAS PADGETT, OF EAST PALESTINE, OHIO, ASSIGNOR OF FORTY PER CENT TO ADAM L. MORRIS, OF EAST PALESTINE, OHIO

TRUCK FOR SANDING SLIPPERY ROADS

Application filed October 27, 1930. Serial No. 491,578.

This invention relates to a truck, the general object of the invention being to provide means for distributing material on highways and other roads to prevent vehicles from slipping or skidding on such highways when the same is covered with ice, snow or the like, and for distributing material on such highways after the same has been tarred or otherwise treated and it is necessary to distribute material thereon.

Another object of the invention is to so form the truck that the body thereof can be tilted either forwardly, when material is to be distributed on the highway, or rearwardly, when the truck is to be used as a dump truck, and to so form the parts that the truck can be used as an ordinary truck when it is not desired to use it for distributing material on a highway.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation showing the body in horizontal position in full lines and in a forwardly tilted position in dotted lines.

Figure 2 is a longitudinal sectional view showing the body tilted rearwardly.

Figure 3 is a top plan view.

Figure 4 is a section on line 4—4 of Figure 1.

Figure 5 is a rear elevation showing the tail gate in lowered position.

Figure 6 is a section on line 6—6 of Figure 5.

Figure 7 is a fragmentary plan view of Figure 5 showing the tail gate in closed latched position.

Figure 8 is a section on line 8—8 of Figure 2.

Figure 9 is a transverse sectional detail view, showing the central and side guides for distributing the material on a highway.

Figure 10 is a detail plan view, showing the friction transmission means for driving the raising and lowering mechanism of the truck body from the power plant of the vehicle.

In these drawings, the letter A indicates the truck and the letter B the body thereof. This body can be pivoted to the chassis of the truck, either at its front end or at its rear end, by the pins or bolts 1 removably engaging portions of the body and truck so that the body can be tilted either forwardly, as shown in dotted lines in Figure 1, or rearwardly, as shown in Figure 2. It will, of course, be understood that when the body is to be tilted forwardly, the pins or bolts 1 are arranged to pivotally connect the forward end of the body with the chassis and when the body is to be tilted rearwardly, the pins are removed from the front part of the body and placed at the rear thereof to pivotally connect the rear part of the body with the chassis.

A pair of racks 2 is pivoted at their upper ends to the bottom of the body, substantially at the center thereof, and these racks are engaged by the pinions 3 carried by the stub shafts 4 rotatably supported by frames 5 fastened to the chassis. Each shaft 4 is connected by the gears 6 with a stub shaft 7 journaled in the frame and the two shafts 7 are connected by the two sets of gears 8 with a shaft 9 journaled in both of the frames 5 and having a friction drum 10 slidably but non-rotatably connected thereto at substantially the center of the shaft.

A shaft 11 is connected with the power plant of the vehicle by the universal joint 12 and this shaft 11 carries a friction wheel 13 with which either friction flange of the drum is adapted to engage when the drum is shifted from a neutral position in either direction. Springs 14 normally hold the drum in a neutral position, with its flanges out of engagement with the friction wheel 13 and said drum is shifted in either direction by a bell crank 15 pivoted to a frame 16 which encloses the drum and in which the shafts 9 and 11 are journaled, said bell crank being connected by a link 17 with a hand lever 18 arranged adjacent the driver's seat so that the driver can shift the drum to place either flange thereof in engagement with the friction wheel. Thus the shaft 9 can be rotated in either direction from the power plant of the vehicle to raise and lower the body B.

It will, of course, be understood that instead of using the friction means, gears can be used, if desired.

The forward end 19 of the body is removably connected with the major part of the body by means of the guideways, shown generally at 20 in Figures 2 to 8, so that by moving the forward part 19 upwardly, the same can be disconnected from the rest of the body and thus the forward end of the body will be open.

An end member 21, composed of the two sections 21', is detachably fastened to the front part of the truck, immediately in rear of the cab or driver's seat thereof so that this end member can be removed whenever desired. This end member is provided with the rearwardly extending side portions 22 and the front end of the body fits in this end member when the body is in lowered position. A downwardly and rearwardly sloping plate 23 is placed in the lower part of the end member and is suitably connected with a part of the truck and forms the forward part of a hopper, the rearward part of which is formed of a plate 24 which is provided with the forwardly and downwardly sloping part 25 which extends between the side members 26 of the chassis. The side portions of the end member 21 are formed with the forwardly and downwardly sloping portions 27 which extend outwardly from the side members 26 and form the end portions of the rear part of the hopper. The inner lower end of each of the parts 27 is formed with a curved lip 28 for directing some of the material on to the road directly under a side member 26 and the plate 25 is formed with a notch 29 through which a drive shaft 11 passes. On each side of the notch, the plate 25 is formed with a lip 30 for directing some of the material on the road directly under the notch 29. Thus material dropping into the hopper will be distributed by the members 25 and 27 on the road surface in front of the rear wheels of the truck so that said wheels will not slip on the surface and such material will prevent other vehicles from slipping or skidding on snow or ice covered surfaces or tarred surfaces. As will be seen, when the truck body is tilted forwardly, as shown in dotted lines in Figure 1, the material therein will drop into the hopper and thus be evenly distributed on to the road surface by the parts 25 and 27.

An agitator 31 is placed in the hopper and the shaft thereof has a sprocket 32 at one end thereof over which passes a chain 33. This chain also passes over a sprocket 34 on a shaft 35 journaled in the lower end of a hanger 36 pivoted to one of the side members of the chassis and the shaft carries a wheel 37 which, when moved against one of the rear wheels of the vehicle, will cause rotary movement of the shaft 35 and this movement of the shaft is imparted to the agitator through the chain and sprockets shown. The hanger is adjusted to place the wheel 37 against the rear wheel of the vehicle or out of engagement with said rear wheel by a lever 38 arranged in the cab and which is connected with the hanger by a link 38'.

A horizontal gate 39 controls the flow of material from the hopper and this gate is operated by a hand lever 40 which is arranged adjacent the driver's seat. Thus by adjusting the hand lever, the flow of material from the hopper on to the road can be entirely stopped or the amount of material flowing from the hopper can be regulated.

From the foregoing it will be seen that by tilting the body forwardly, material therein will flow into the hopper, where it is agitated by the agitator 31 and said material will be evenly distributed on the road surface by the parts 25 and 27. Thus material can be easily and quickly spread upon a road surface so as to cover snow, ice or other slippery material on the road surface and material, such as sand, gravel and the like, can be placed on the road surface to cover the same when the surface has been tarred or otherwise treated.

When the truck is to be used in an ordinary manner, the pins 1 are placed at the rear of the truck so that the body can be tilted rearwardly, as shown in Figure 2, and when this is done, the removable front part 19 of the body is put in place. The body may be provided with the usual division members 41 and the tail gate 42 can be pivotally connected with the body at either its upper or lower end. Brackets 43 are fastened to the sides of the body at the rear end thereof and are formed with recesses 44 for receiving the pintles 45 at the rear end of the gate. Hooks 46 hold the pintles in the recesses of the brackets, these hooks being fastened to a shaft 47 extending under the body and a link 48 is connected to an arm 49 at one end of the shaft. This link is slidably supported by a bracket 49' on one side of the body and has an eye 50 at its forward end which, when the body is in lowered position, will engage an upright 51 on a rod 52, the forward end of which is connected to a hand lever 53 arranged adjacent the driver's seat. Thus by pulling the lever forwardly, the hooks 46 will be raised to hold the pintles of the end gate in the recesses of the brackets 43 so that the end gate is hingedly connected at its lower end with the body. By pushing the hand lever 53 rearwardly, the hooks 46 will be lowered so that the pintles of the end gate can pass from the recesses in the brackets 43. By providing the eye 50 on the link 48 and the projection 51 on the rod 52, the parts will separate when the body is raised and will again engage each other when the body is lowered.

Brackets 54 are fastened to the top of the sides of the body at the rear thereof and these brackets are notched, as at 55, to receive pintles 56 at the top of the end gate, the pintles being held in the notches by the pins 57 passing through holes in the brackets 54 so as to hingedly connect the upper edge of the end gate to the top of the body. The pins are carried by chains 58 which are connected respectively with the brackets 54 and the end gate. These chains will hold the end gate in horizontal position when it is pivotally connected with the lower brackets 43, as shown in Figure 5, and of course, when the gate is hinged at its lower end and it is desired to lower the gate, the pins 57 must be removed from the brackets 54 so that the gate can drop. The pins 57 act to hold the gate in closed position and said pins also act to hold the upper pintles 56 in the notches of the brackets 54 when the gate is to be pivoted at its top so that it can swing outwardly, as shown in Figure 2.

Thus I have provided a truck which can be used for distributing material on a road surface in front of the rear wheels of the truck and which can be easily converted into an ordinary truck for hauling various kinds of material.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A truck having a transversely arranged hopper thereon located in front of the drive wheels thereof, means associated with the hopper for distributing material across the road on which the truck is traveling, a body on the truck, a removable closure between the body and hopper and means for causing the material in the body to pass into the hopper when said closure is removed.

2. A truck having a transversely arranged hopper thereon arranged in front of the drive wheels of the truck, means associated with the hopper for distributing material across the road on which the truck is traveling, a gate for controlling the discharge of material from the hopper, a body on the truck for communication with the hopper, a removable closure between the hopper and body and means whereby the body can be tilted into a forward position to cause the material therein to be dumped into the hopper when the closure is removed.

3. A truck having a transversely arranged hopper thereon located in front of the drive wheels of the truck, means associated with the hopper for distributing material across the road on which the truck is traveling, a gate for controlling the flow of material from the hopper, a body on the truck having its front end removable, means operated from the power plant of the vehicle for moving the body into a forwardly tilted position to cause material therein to pass into the hopper.

4. A truck having a transversely extending hopper on the chassis thereof arranged intermediate the ends of the chassis, means associated with the hopper for distributing material across the road on which the truck is traveling, a manually operated gate for controlling the flow of material from the hopper, a body on the truck and communicative with the hopper, means for pivoting either the front end of the body or the rear end thereof to the chassis, means for tilting the body either forwardly or rearwardly, according to which end is pivotally connected with the chassis, and operated from the power plant of the vehicle and gates removably connected to the ends of the truck body, the gate between the hopper and body controlling communication therebetween.

In testimony whereof I affix my signature.

THOMAS PADGETT.